US006529269B1

(12) United States Patent
Sugata

(10) Patent No.: US 6,529,269 B1
(45) Date of Patent: Mar. 4, 2003

(54) PAPER SHEET IDENTIFICATION METHOD AND DEVICE

(75) Inventor: Masanori Sugata, Namegawa-Machi (JP)

(73) Assignee: Nippon Conlux Co., Ltd., Tokyo (JP)

( * ) Notice: Subject to any disclaimer, the term of this patent is extended or adjusted under 35 U.S.C. 154(b) by 0 days.

(21) Appl. No.: 09/672,260

(22) Filed: Sep. 28, 2000

(30) Foreign Application Priority Data

Sep. 28, 1999 (JP) .......................................... 11-274534

(51) Int. Cl.[7] ............................ G06K 9/74; G06K 9/00

(52) U.S. Cl. ........................................ 356/71; 382/135

(58) Field of Search .......................... 356/71, 402, 408, 356/432, 433, 445, 448; 250/559.01, 559.38, 555, 556; 382/135, 137

(56) References Cited

U.S. PATENT DOCUMENTS 4,837,840 A * 6/1989 Goldman ....................... 382/7
6,050,387 A * 4/2000 Iwaki ......................... 194/207

* cited by examiner

*Primary Examiner*—Michael P. Stafira
(74) *Attorney, Agent, or Firm*—Koda & Androlia

(57) ABSTRACT

Disclosed are a method and a device capable of high-precision identification of a color-copied paper sheet without increasing the amount of data extracted from the paper sheet. The method and device fox identifying a paper sheet radiate at least two lights having different wavelengths onto the paper sheet, detect light which has permeated therethrough or been reflected therefrom, detect a change in direction of the strength of the detected light, produce coded data, and identify the authenticity of the paper sheet by comparing said coded data with predetermined reference data.

7 Claims, 3 Drawing Sheets

| | | | | | | | | | | | | | |
|---|---|---|---|---|---|---|---|---|---|---|---|---|---|
| OBJECT DATA | 0 | 5 | 8 | 8 | 4 | 0 | 0 | 3 | 7 | 4 | 5 | 8 | TOTALIZED VALUE ↓ |
| REFERENCE DATA | 0 | 5 | 8 | 8 | 5 | 1 | 0 | 3 | 8 | 5 | 5 | 8 | |
| A=DETERMINATION WITH TWO-VALUE | 1 | 1 | 1 | 1 | 0 | 0 | 1 | 1 | 0 | 0 | 1 | 1 | |
| B=WEIGHT | 8 | 4 | 7 | 8 | 2 | 3 | 3 | 7 | 5 | 5 | 6 | 8 | 66 |
| A×B | 8 | 4 | 7 | 8 | 0 | 0 | 3 | 7 | 0 | 0 | 6 | 8 | 51 |

PAPER SHEET IDENTIFICATION METHOD AND DEVICE

BACKGROUND OF THE INVENTION

The present invention relates to a method and a device for identifying the authenticity of paper sheets comprising paper money, and more particularly relates to identification using optically detected data.

PRIOR ART

When determining the authenticity of paper money, for example, light is radiated across the paper money, and permeated light and reflected light are extracted. Sampling data are obtained from the extracted light, and the sampling data is compared with reference data which has been set beforehand.

A single-wavelength light source is normally used, but when determining the authenticity of paper money using such a light source, it is not possible to determine the authenticity of paper money which has been reproduced on a sophisticated color copier.

SUMMARY OF THE INVENTION

The present invention has been conceived in order to solve the above problem, and aims to provide a method and a device capable of high-precision identification of a color-copied paper sheet, without increasing the amount of data extracted therefrom.

In order to achieve the above goals, the present invention provides (1) a method for identifying a paper sheet, comprising the steps of radiating at least two lights having different wavelengths onto the paper sheet, and detecting light which has permeated therethrough or been reflected therefrom; detecting a change in direction of the strength of the detected light, and producing coded data; and identifying the authenticity of the paper sheet by comparing the coded data with predetermined reference data; and (2) a device for identifying paper sheets, comprising a carrying unit which conveys a paper sheet along a predetermined path; a radiation unit, provided near the carrying unit and having a switching unit which selectively operates at least two lights having different wavelengths and a light source thereof, the radiation unit sequentially radiating the light from the light source onto the paper sheet being conveyed on the carrying unit; a signal producing unit which converts light permeated through the paper sheet, and light reflected from the paper sheet, to a signal, the light having been detected after being radiated onto the paper sheet by the radiation unit; a change detection unit which codes a change in direction of the strength of the signal from the signal producing unit, and produces detected data therefrom; and a determination unit which has predetermined reference data, and determines the authenticity of the paper sheet by comparing the detected data from the change detection unit with the reference data.

PREFERRED EMBODIMENT

Figure 1:
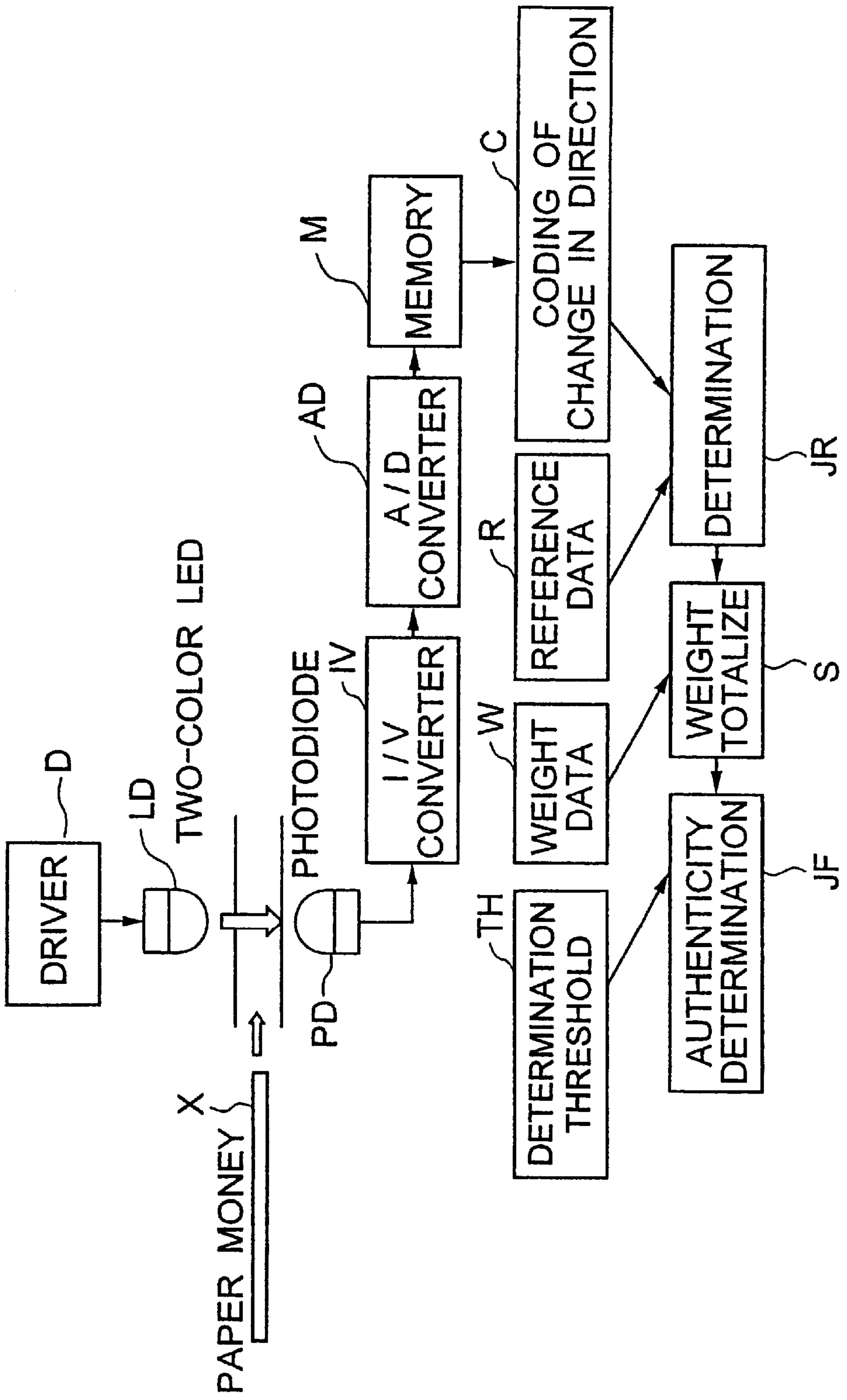
FIG. 1 is a block diagram showing a configuration of an embodiment of the present invention.

FIG. 1 is a block diagram showing a configuration of a embodiment of the present invention. This embodiment identifies paper money X, which is conveyed along a carrying path. A light-emitting diode LD and a photodiode PD are provided on the carrying path on either side of the paper money X.

The light-emitting diode LD is driven by a driver D and generates lights of at least two colors, e.g. red and green. The lights are generated alternately and periodically over predetermined intervals of time, thereby radiating a pulsed light. Lights of three colors may be generated using a light-emitting diode Which also generates blue light.

The pulsed light is radiated onto the paper money X, and the photodiode PD receives light which has permeated through the paper money, or light which has been reflected from the surface of the paper money. The photodiode PD produces a pulsed current signal in accordance with the input light, and sends the current signal to a current/voltage converter IV.

The current/voltage converter IV outputs a pulsed voltage. An analog/digital converter AD converts the voltage output to a digital signal corresponding to the size of the voltage output. The digital signal is stored in a memory M as data relating to the permeated light and the reflected light in the direction which the paper money is carried. Consequently, data for the permeated light and the reflected Light of two colors (red and green) is stored in the memory M. The data stored in the memory M is used during data processing to determine the authenticity of the paper money.

The data stored in the memory M is transmitted to a change in direction coder C, and compared with present data and previous data. It is determined whether the data is rising, descending, or stationary, and the determination result is transmitted to a determination circuit JR of each region. The determination circuit JR of each region compares the data with reference data from a reference data circuit R. The reference data is obtained from an appropriate number of genuine bills used for reference.

The result determined by the determination circuit JR of each region is sent to a weight-assigning circuit S, which assigns weight data from a weight data circuit W and calculates a total result. The total result is sent to an authenticity determination circuit JF, where it is compared with a threshold value from a determination threshold circuit TH, thereby determining its authenticity.

Figure 2:
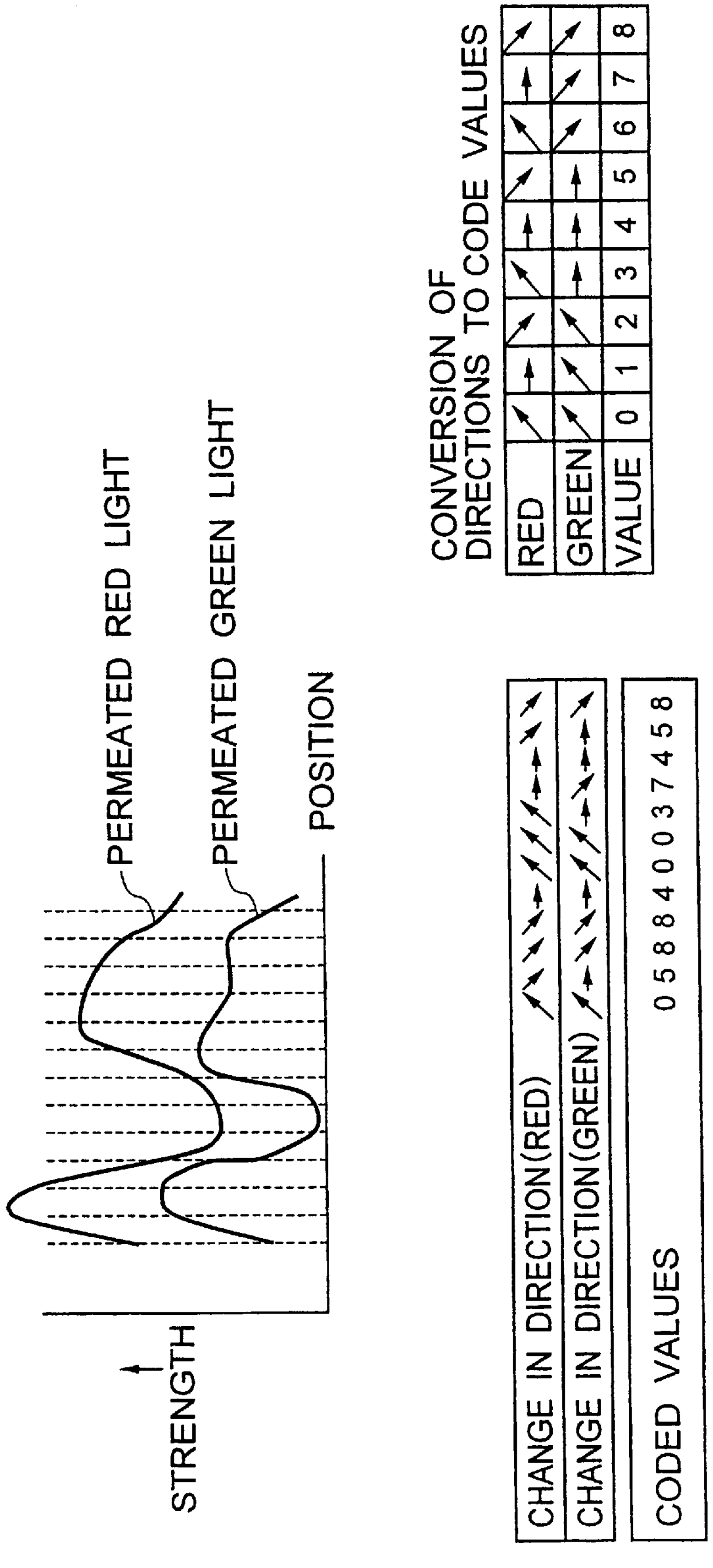
FIG. 2A is a diagram showing changes in the strength of two colors of permeated light, and coded results thereof.
FIG. 2B is a chart showing directions of the colored light and coded conversions thereof.

FIG. 2A is a diagram showing changes in the strength of red and green permeated light, detected when the paper money passes along the carrying path, and coded results thereof. FIG. 2B shows an example of a conversion chart when combinations of the changes in strength of the red and green permeated light are coded into nine values.

The nine values represent all combinations of change in direction: "0" when both red and green are rising, "1" when red is stationary and green is rising, "2" when red is descending and green is rising, "3" when red is rising and green is stationary, "4" when both red and green are stationary, "5" when red is descending and green is stationary, "6" when red is rising and green is descending, "7" when red is stationary and green is descending, and "8" when both red and green are descending.

Nine values are obtained for two colors, and twenty-seven values are obtained for three colors, but only three values are obtained when the light is monochrome. Therefore, two colors achieve a detection precision which is three times that of monochrome, and three colors achieve a detection precision which is nine times that of monochrome.

In FIG. 2A, due to the characteristics of the light-emitting diode and the photodiode, the red light is strong and the green light is weak. Although the overall changes in both colors are approximately the same, their changes are different when viewed in closer detail. The broken lines shown thirteen points on the change graph lines, and when these are converted to the chart of FIG. 2B while noting the change in direction of the strength of the received lights, the values obtained are "0, 5, 8, 8, . . . 4, 5, 8", as shown in the diagram.

Irrespective of whether the light-receiving level of the permeated light is high or low, the strengths of the received lights always change in the same directions. Therefore, even when the light-emitting level of the light source fluctuates, and/or the permittivity of the paper money fluctuates, the same design will result in the same change in direction.

When the paper money is dirty, it is difficult to prevent the dirt from affecting an authenticity check based on received-light levels. However, the effect of dirt on the chance in direction of the received-light levels can be reduced by collecting the data from regions smaller than the duty region, so that the dirt does not affect the change in direction. This improves precision when determining authenticity.

Furthermore, even when the received-light level is affected by mistakes in the printing and the finish of paper money, the change in direction remains unaffected, except in the regions of the extreme values. This also improves precision when determining authenticity.

The detected colors are compounds comprising the color of the paper and the color of the printing ink. Therefore, the light is not detected merely by the color of the printing ink, and the color of the paper must be taken into consideration.

Figures 3, 4:
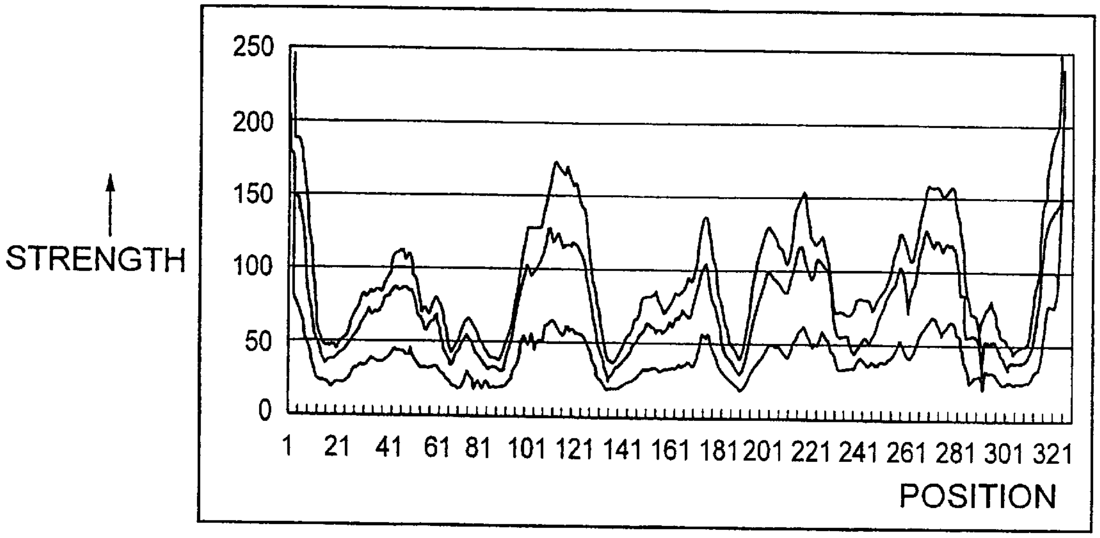
FIG. 3 is a totalization chart showing a total result obtained by calculating a total of two-value determination results.
FIG. 4 is a diagram showing changes in the characteristics of transmitted light of three colors (red, green, and blue).

FIG. 3 shows the contents of a process for assigning weights and calculating a total of the two-value determination result in each region. When the object data, shown as a general coded result in FIG. 2A, is determined with two values using the reference data, results of "1, 2, 1, 1, 0, 0 . . . 1, 1" are obtained, as shown in FIG. 3. The two-value results are multiplied by weights, that is, numeric values calculated in accordance with the accuracy of the amount (incidenceof directional characteristics in each region. The result of this calculation (two-value determination x weight) is "8, 4, 7, 8, 0, . . . 0, 6, 8".

Due to variation at the edges of the paper money or near the border of the design, the weights should be made smaller in these regions in order to reduce their significance.

FIG. 4 Shows characteristics of permeated light, measured over the entire paper money, when a three-color light-emitting diode is used instead of the above two-color light-emitting diode. Measurements were taken at three hundred and twenty-one points on the surface of the paper money, and show two hundred and fifty-six stages of strength. These changes are coded in a code conversion chart prepared beforehand. Twenty-seven codes were required.

Modification

The checking method of the embodiment described above used permeated light, but the present invention can be similarly applied to a checking method using reflected light. A combination of permeated light and reflected light can also be used. The colored light need not only be light visible to the human eye. For example, a combination of red and infrared light, or a magnetic detection signal and an optical detection signal, may be used.

In addition to the paper money, the paper sheets to be detected may comprise cards, vouchers, all types of coupons, and the like.

As described above, according to the present invention, at least two lights having different wavelengths are radiated onto a paper sheet, and data obtained by receiving light which has permeated through or been reflected from the paper sheet is compared with reference data in order to determine the authenticity of the paper sheet. Therefore, since there is little adverse affect from fluctuation in the received light level, the determination process can be performed consistently. Moreover, by detecting the difference in chromaticity, even sophisticated color copies can be identified with high precision.

By detecting the change in direction of the data, processing can be carried out at high speed with no need for complex calculations. Since the data is processed based on the simple characteristic of the change in direction of the received light level, the size of the data can be kept small.

What is claimed is:

1. A device for identifying paper sheets, comprising:

a carrying unit which conveys a paper sheet along a predetermined path;

a radiation unit, provided near said carrying unit and having a switching unit which selectively operates at least two lights having different wavelengths and a light source thereof, the radiation unit sequentially radiating the light from said light source onto the paper sheet being conveyed on said carrying unit;

a signal producing unit which converts light permeated through or light reflected from said paper sheet to a signal, the light having been detected after being radiated onto said paper sheet by said radiation unit;

a change detection unit which codes a change in direction of the strength of the signal from said signal producing unit, and produces detected data therefrom; and a determination unit which has predetermined reference data, and determines the authenticity of the paper sheet by comparing the detected data from said change detection unit with said reference data.

2. The device for identifying paper sheets according to claim 1, wherein said signal producing unit comprises a memory for storing said signal.

3. The device for identifying paper sheets according to claim 1, wherein said change detection unit produces the detection data by using codes corresponding to the rise, descent, or stationary state, of the size of the signal from said signal producing unit.

4. The device for identifying paper sheets according to claim 1, wherein said determination unit assigns to the determination result based on said reference data, the weights corresponding to regions of said paper sheet.

5. The device for identifying paper sheets according to claim 1, wherein said determination unit assigns weight data to determination remits of each region, the results having being obtained by comparing the detected data from said change detection unit with said reference data, calculates the weight total, and determines the authenticity of said paper sheet using the weight total result.

6. The device for identifying paper sheets according to claim 1, wherein said determination unit comprises a determination threshold value unit which outputs a predetermined determination threshold value, and an authenticity processing unit which authenticates said weight total result using the determination nation threshold value from said determination threshold value unit.

7. The device for identifying paper sheets according to claim 1, wherein said signal producing unit produces a digital signal, and said change detection unit and said determination unit process the digital signal.

* * * * *